United States Patent [19]
Rocha

[11] 3,918,297
[45] Nov. 11, 1975

[54] ACOUSTIC IMAGING APPARATUS WITH GRAY SCALE DISPLAY

[75] Inventor: Henry A. F. Rocha, Schenectady, N.Y.

[73] Assignee: General Electric Company, Schenectady, N.Y.

[22] Filed: Oct. 3, 1974

[21] Appl. No.: 511,616

[52] U.S. Cl. ................. 73/67.7; 73/67.8 S; 73/67.9
[51] Int. Cl.² ........................................ G01N 29/04
[58] Field of Search ............ 73/67.7, 67.8 R, 67.8 S, 73/67.9

[56] References Cited
UNITED STATES PATENTS

| | | | |
|---|---|---|---|
| 3,367,173 | 2/1968 | Uphoff | 73/67.8 R |
| 3,548,641 | 12/1970 | Mitchell | 73/67.9 |
| 3,780,572 | 12/1973 | Rocha | 73/67.5 R |

Primary Examiner—Richard C. Queisser
Assistant Examiner—John P. Beauchamp
Attorney, Agent, or Firm—Donald R. Campbell; Joseph T. Cohen; Jerome C. Squillaro

[57] ABSTRACT

To obtain an estimate of the reflectivity of internal heterogeneities in an object, a repeating series of acoustic pulses with sequentially variable amplitudes is incident on the object. The corresponding echoes are sensed by a transducer-amplifier array and converted to binary data representing sensed echoes above a predetermined comparator level. The binary output data is periodically amplitude-modulated conversely to the acoustic pulses to obtain a brightness modulated visual display indicative of the reflectivity of the heterogeneity. This measure of reflectivity is used to estimate the size of a small target and the angulation and acoustic impedance of a large target in nondestructive testing and medical diagnostic applications.

10 Claims, 14 Drawing Figures

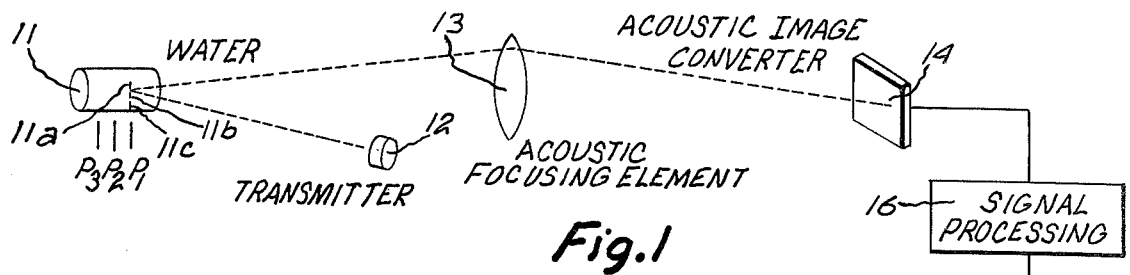
Fig.1
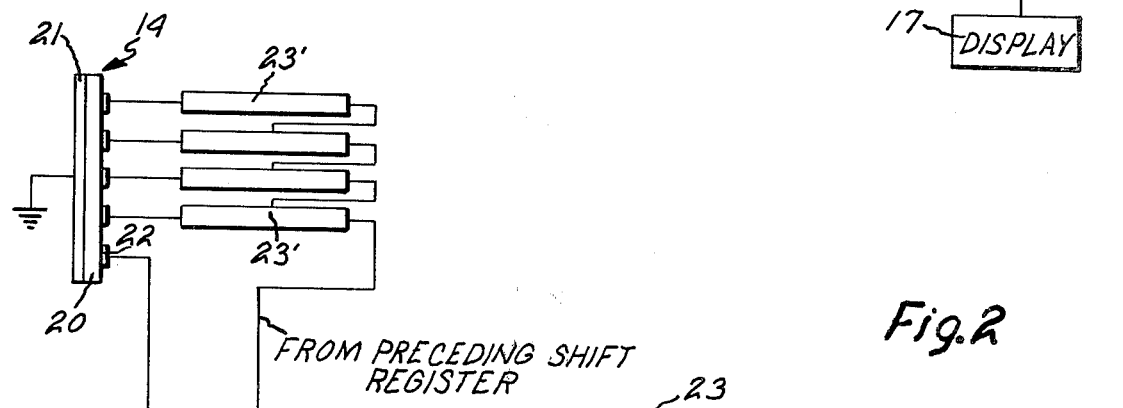
Fig.2
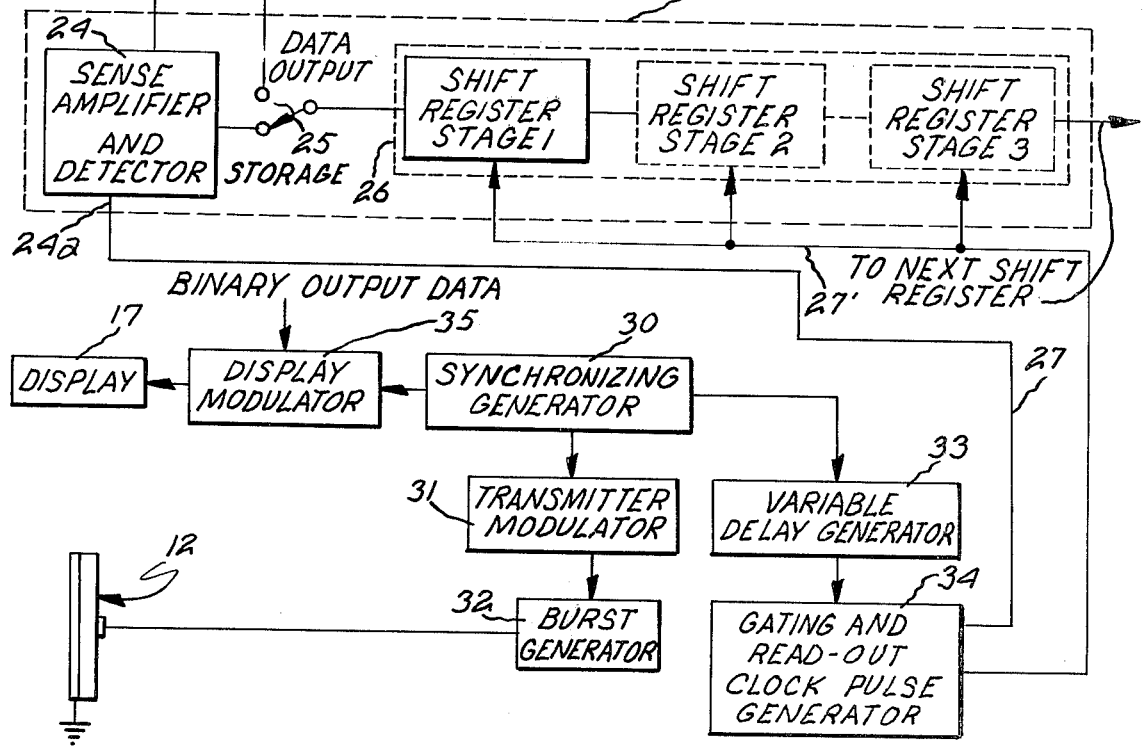

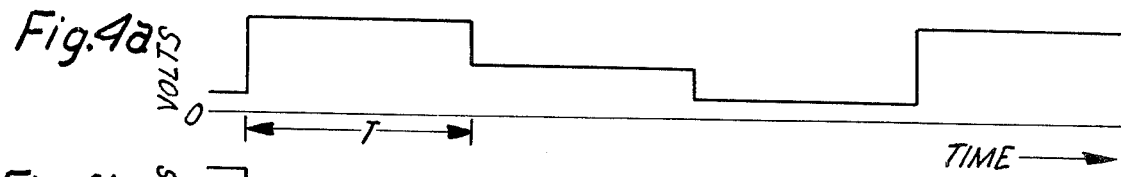
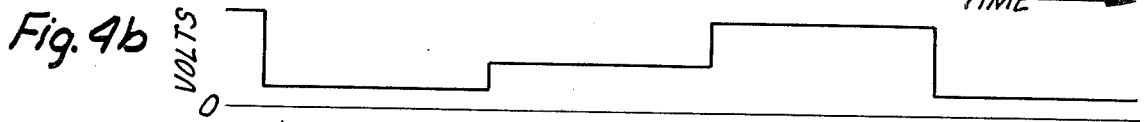
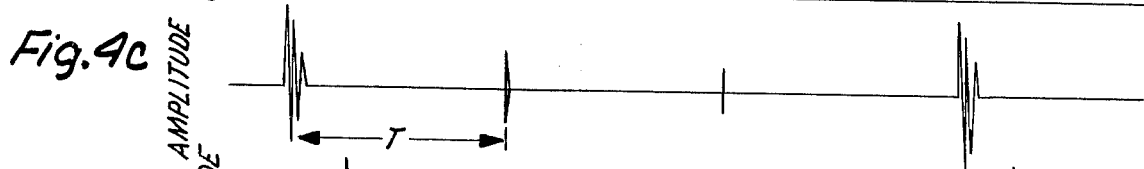
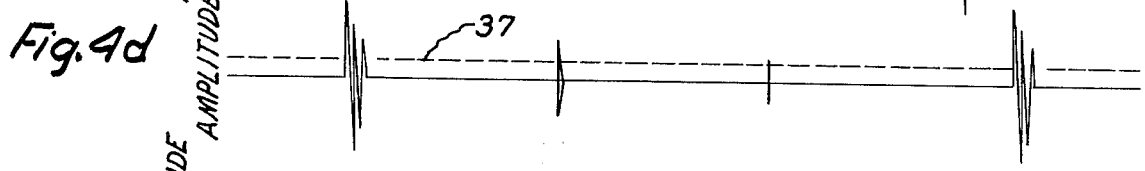
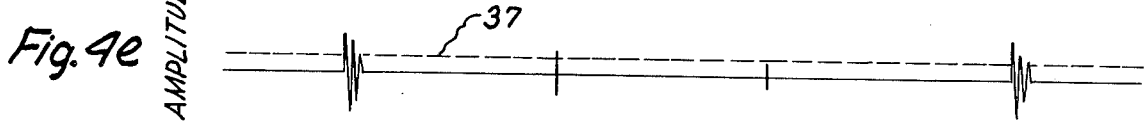
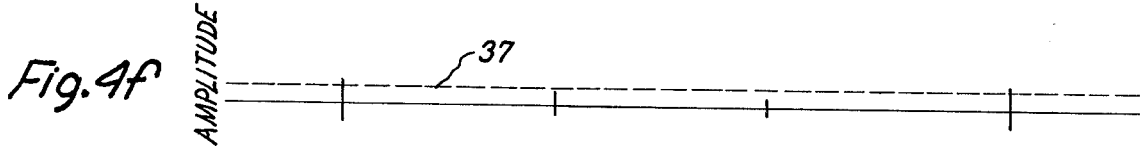
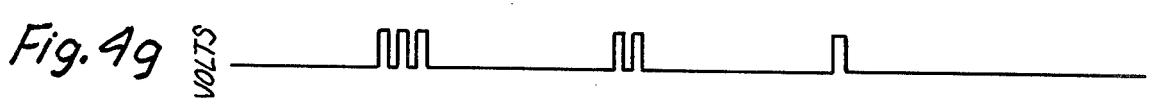
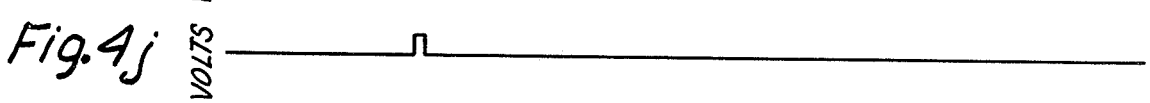

ACOUSTIC IMAGING APPARATUS WITH GRAY SCALE DISPLAY

BACKGROUND OF THE INVENTION

This invention relates to acoustic imaging apparatus for the internal and external visualization of objects, and more particularly to a system with a visual display having a brightness modulation. Typical applications are the nondestructive testing of solid objects for flaws, and the visualization of biological structure.

In U.S. Pat. No. 3,780,572 granted on Dec. 25, 1973 to the inventor, and assigned to the same assignee, there is disclosed an acoustic imaging apparatus which utilizes a transmitter for directing periodic acoustic bursts toward the object, and a planar acoustic image converter with sensors in rows and columns for converting the focused echoes into electrical signals. By gating the amplified outputs of the piezoelectric sensors at selected time intervals following generation of an acoustic echo, an image of a planar region at a particular depth within the object is formed on a light-emitting diode array or other visual display. For each incident acoustic pulse there is a single two-dimensional image, with provision for changing the gating time for sequentially imaging other depths within the object. Another copending application, Ser. No. 403,224, filed Oct. 3, 1973 by C. W. Eichelberger and P. M. Garratt, and assigned to the same assignee, discloses an apparatus with provision for a "three-dimensional" display obtained by the coincident display of images of multiple planar regions in the object. In response to each acoustic burst, the reflected echoes at different object depths are sequentially sensed and stored as binary data in a multi-stage shift register associated with each piezoelectric sensor. The individual shift registers are serially connected for rapid read-out. Multiple images resulting from each periodic acoustic pulse can thus be displayed coincidentally in real time, for example as a stereo visual display, to achieve depth perception.

In both the Rocha and Eichelberger-Garratt systems, each display bit corresponding to one sensor in the planar acoustic image converter is or can be a bright dot when the reflected echo exceeds a predetermined sound pressure level, and the dot is off for sound pressures below that level. Such binary systems can be used for many purposes but are not suitable for use in those applications or operating modes where the amplitude of the echo is needed or has been traditionally measured to obtain the desired information. Acoustic imaging and testing systems often measure the reflectivity of targets or heterogeneities by using a series of periodic bursts of acoustic energy having a constant amplitude which are incident on the object under examination, and measuring the amplitude of the echoes produced by each target. This measurement of reflectivity can be used to estimate the size of a small target less than one wavelength in size so as to fall within the Rayleigh scattering region, and in the case of large specularly reflecting targets can lead to the estimation of the angular orientation of the target and the acoustic impedance of the target. An alternative technique for estimating the the reflectivity of an acoustic heterogeneity is described herein.

SUMMARY OF THE INVENTION

In an acoustic imaging system generally of the foregoing type but with provision for changing the sensitivity of the system, a series of periodically timed acoustic pulses or bursts with variable amplitudes preferably according to a predetermined pattern is generated. The resulting train of acoustic echoes is of varying intensity depending on the reflectivity of the acoustic heterogeneity and the amplitude of the acoustic pulses. The variable intensity echoes from each heterogeneity in a planar object region are sensed periodically by an acoustic image converter and converted to binary electrical data representing the amplitudes of the sensed echoes above and below a predetermined comparator level.

As previously described, the acoustic image converter and gating circuitry therefor comprises an array of transducers and associated signal processing channels suitably including a sense amplifier and detector and an individual shift register for periodically reading out binary output data. The amplitude of the binary output data is varied in converse manner to the corresponding acoustic pulses. Upon being supplied to visual display equipment, the coded variable amplitude output data is displayed periodically to produce images having a brightness modulation indicative of the reflectivity of the heterogeneity.

Preferably the acoustic pulses and binary output data resulting from each acoustic pulse are conversely amplitude-modulated in repeating series wherein there are progressive step changes by decibel steps within each series. A synchronizing generator can be provided for producing complementary and synchronous stepped-wave voltages which change periodically for controlling the modulating circuitry. In one embodiment with a single cathode ray tube or light-emitting diode display device, a two-dimensional gray scale image of a selected planar object region is displayed periodically. In a second embodiment with a stereo visual display such as two simultaneously viewed cathode ray tubes, multiple images of different planar regions at varying depths in the object are displayed coincidentally in each acoustic pulse period to achieve a three-dimensional display. Typical applications are in nondestructive testing and medical diagnostics as previously mentioned.

BRIEF DESCRIPTION OF THE DRAWINGS

FIG. 1 is a diagrammatic perspective view of acoustic imaging apparatus as used according to the present invention to visualize small workpiece flaws which act as scatterers, showing in block diagram form the processing of the output data for gray scale display to indicate the reflectivity or size of such flaws;

FIG. 2 is a block diagram of a single signal processing channel associated with one piezoelectric sensor with capability for storing and reading out in binary from the sensed signals, and of the acoustic pulse generation and display signal processing circuitry;

FIGS. 4a and 4b are waveform diagrams of the complementary descending and ascending stepped-wave voltages used cyclically for transmitter modulation and display modulation;

FIGS. 4c–4f are diagrams respectively showing the timing and relative amplitudes of the incident acoustic pulses, and the echoes produced by the large, intermediate and small-sized scatterers or flaws;

FIG. 4g is a waveform diagram of the serial, binary output data obtained by read-out of the acoustic image converter;

FIGS. 4h–4j are waveform diagrams of the modulated signals supplied sequentially to the cathode ray tube or other display device to respectively form the images of the large, intermediate, and small-sized scatterers or flaws.

DESCRIPTION OF THE PREFERRED EMBODIMENTS

Figure 3:
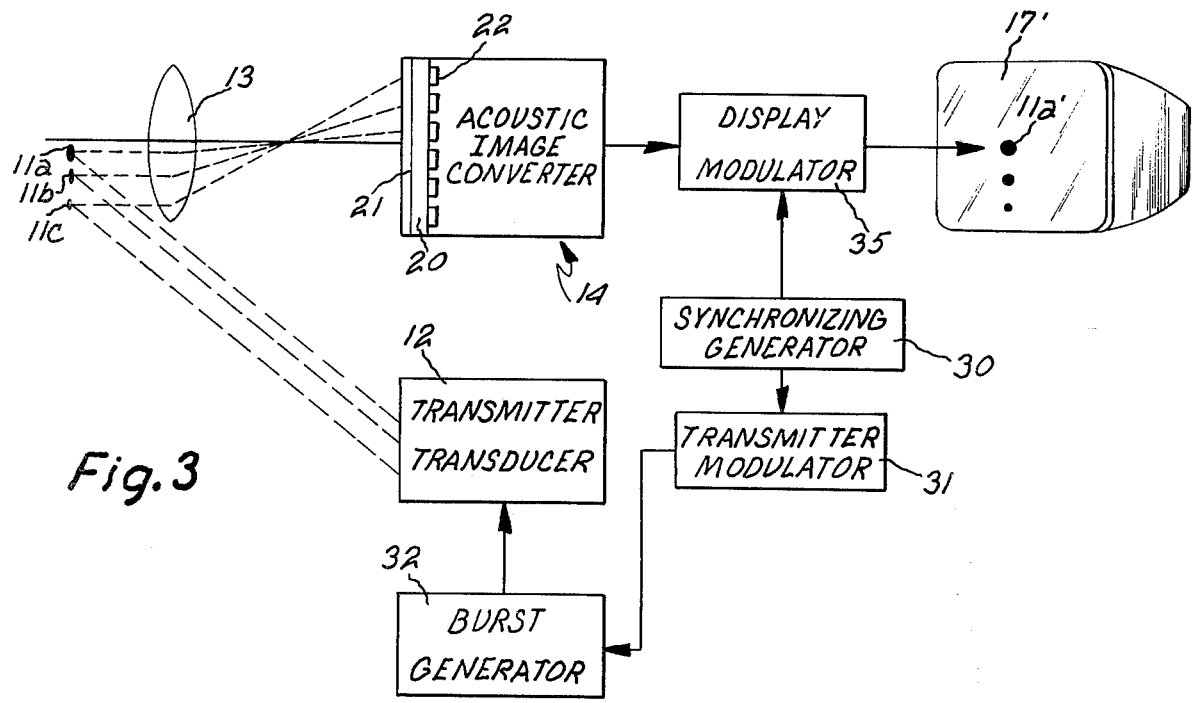
FIG. 3 is a simplified diagram of the main components of the acoustic imaging apparatus and of the circuitry for obtaining brightness modulation in a two-dimensional visual display.

In the acoustic imaging system shown schematically in FIG. 1, both the object and the entire apparatus, with the exception of the control circuitry and the visual display equipment, are immersed in a tank of water or other suitable liquid. The object is a shaft 11 or other solid workpiece being inspected for internal flaws. As was mentioned, another large class of applications in addition to nondestructive testing is the examination of biological organs and tissues. The present acoustic imaging apparatus is explained in detail with regard to the visualization of the approximate reflectivity or size of relatively small acoustic heterogeneities having dimensions less than one wavelength of the incident acoustic pressure waves, such as the different sized flaws 11a, 11b, and 11c, which act as Rayleigh scatterers rather than spectral reflectors. Other applications for the variable sensitivity acoustic imaging apparatus with gray scale display capability for estimating the orientation or acoustic impedance of a large, specularly reflective target will be mentioned later.

In the use of the acoustic imaging apparatus, acoustic energy bursts or pulses are generated periodically by transmitting transducer 12 and directed toward the workpiece 11. The reflected acoustic echoes from the front and back of the workpiece 11, and the acoustic echoes from the internal discontinuities 11a, 11b, and 11c are produced at varying times after the launch of the acoustic burst, depending upon the distance from the transmitter. These acoustic pulses typically have a repetition rate of 30 to 1000 per second to allow sufficient time between succeeding pulses for acoustic reverberations to subside within the object, the liquid-filled tank, and various components of the apparatus. The train of reflected acoustic echoes is focused by a suitable acoustic focusing lens 13 or by a suitable mirror system (not shown), and are thereafter incident on a planar acoustic image converter 14 having a two-dimensional array of acoustical transducers. The transducer array converts the spatial distribution of the acoustical pressure waves incident on one surface thereof into a corresponding array of electrical signals, each of which is sensed and selectively stored in binary form in a single stage or multi-stage shift register. By appropriately timing the gating of the sensed electrical signals to the parallel-entry shift registers with respect to the launching of each acoustic burst, electrical data is stored from which the image of one or more planar regions in the object 11, such as the planes P1, P2, and P3, can be formed. For a three-dimensional display, multiple images at different depths in the object within a short time period are required. In the interest of clarity, the preferred embodiment is explained with regard to the imaging of only the planar region P1 within each acoustic pulse period, for the forming of a two-dimensional image.

When the size of the acoustic heterogeneities 11a–11c, which can be voids or cracks in the metal, is small enough to be in the Rayleigh scattering region, the acoustic echoes resulting from scattering do not follow the law of spectral reflection and tend to have uniform spherical waveforms. The intensity of the scattered acoustical energy, analogous to the scattering of light, is proportional to the incident intensity and to the square of the volume of the scatterer. That is, the sound pressure level of the echoes from a large scatterer is higher than that from a smaller scatterer. The basis for obtaining a gray scale display is that the amplitude of the acoustical pulses is varied sequentially in known manner, rather than being kept constant as previously, to in effect vary the sensitivity of the system. Thus, small scatterers with low reflectivity produce detectable echoes only when the amplitude of the incident acoustic pulse is high, while large scatterers with high reflectivity produce detectable echoes for the lower amplitude acoustic pulses as well as the higher amplitude acoustic pulses. Correspondingly, the amplitude of the corresponding electrical output data fed to the display device is varied in complementary or converse fashion to the amplitudes of the transmitted pulses to modulate the brightness of the corresponding portion of the image on the display device, with the result that the large scatterers produce bright images while the small scatterers produce dim images. Within each acoustic pulse time frame, stored binary data in the acoustic image converter 14 is read out serially at a rapid clock rate and fed to a signal processing apparatus 16 which as a minimum has provision for modulating the amplitude of the binary output data before being supplied to the gray scale display device 17. Display device 17 can be, for example, a cathode ray tube or a planar array of light-emitting diode elements.

Referring to FIG. 2, acoustic image converter 14 includes a transducer array comprised by piezoelectric transducer plate 20 which converts the acoustic pressure waves into electrical potential differences created between its opposed faces. Transducer plate 20 is made of lead zirconate-titanate or other suitable material and has a continuous metallic coating 21 on its outer face and a plurality of generally square metallic contacts 22 on its internal face. Alternatively it may have a plurality of discrete contacts on each face with a plated-through connection or other means to bring a conductive path from the front to the back contact. The individual contacts 22 are arranged in columns and rows, and by way of illustration includes a 10 × 10 matrix of sub-arrays, each in turn having a 10 × 10 matrix of piezoelectric sensors, making a total of 10,000 sensors or imaging sites. Acoustic stresses applied to the outer surface of plate 20 in the form of a spatial distribution of reflected or scattered acoustic echoes produce voltages between the contacts 22 and conductive coating 21 which vary with the applied acoustic stress. Thus, the voltage distribution is a representation of the distribution of the acoustic pressure waves incident on the outer face of the piezoelectric plate 20. Associated with each individual sensor is a signal processing channel, one of which is shown in detail and indicated generally at 23, for providing point-by-point time-gated amplification, level comparison, binary storage, and rapid read-out capability for the stored information. Each individual signal processing channel 23 includes a sense amplifier and detector 24 for the transducer signal which is rendered conductive, or produces an output, only when a gating or strobe pulse is applied to its gating input terminal 24a. The output is a binary ONE or ZERO depending upon whether the sensed electrical signal, and thus the incident sound pressure level is above or below a predetermined comparator level. Assuming that the two-position switch 25 is in the "storage" position, a binary ONE output is fed to the first stage of an individual associated shift register 26. To image only the single planar region P1 in the object, a one stage shift register is sufficient, but the additional stages 2 and 3 are needed for sequentially storing and shifting data for the other planar regions P2 and P3 for a stereo display with depth perception. In addition to providing binary storage, the individual shift registers 26 can be connected serially to in effect form one long shift register for the serial read-out of the stored information. This is accomplished near the end of the acoustic pulse period by moving the switch 25, which can be a solid state switch, to the "data output" position to thereby connect the last state of the preceding shift register to the first stage of the following shift register. This is illustrated schematically by the connection of additional signal processing channels 23' associated with other transducers in the array. Read-out clock pulses are supplied in parallel over a conductor network 27' to all of the shift register stages to effect sequential shifting of the stored data from one shift register to the next, and so on. Since clock pulse rates to 10 megahertz are possible, the readout cycle can be very short. Instead of having a single data output line from the last stage of all the shift registers for the entire transducer array, the information can be outputted in parallel from the various sub-arrays.

A typical arrangement of the remainder of the electronic circuitry is also shown in block diagram form in FIG. 2. A synchronizing generator 30 establishes the period of the acoustic bursts, and in accordance with the invention its output is fed through a transmitter modulator 31 wherein the signal is amplitude-modulated for $n$ cycles, preferably by decreasing the signal by a constant ratio so that the change can be expressed in decibels per step. The amplitude-modulated output is supplied to a burst generator 32 for generating short bursts of electrical waves usually at frequencies in the range from 500 kilohertz to 20 megahertz. The burst generator 32 produces a train of spaced, periodically amplitude-modulated electrical exciting signals for the transmitting transducer 12. Transmitter 12 is suitably a transducer which generates the repeating series of acoustic bursts which are sequentially coded in amplitude and propagate through the liquid and are incident upon the object 11. The synchronizing generator 30 also coordinates the timing of the gating and read-out clock pulses for a signal processing channel 23 in the acoustic image converter 14. By way of example, synchronizing pulses are supplied to a variable delay generator 33 for timing the actuation of a gating and read-out clock pulse generator 34. In this arrangement, the conductor 27 makes connection to the gating input terminal 24a of the sense amplifier and detector 24 and separate conductors 27' make connection to each stage of the shift register 26. In accordance with the invention, the output synchronizing generator 30 is also supplied to a display modulator 35 wherein the serial, binary read-out data is periodically amplitude-modulated for $n$ cycles in corresponding, converse fashion. The amplitude-modulated output data produced a brightness modulated image in display device 17 as previously explained.

The operation of the acoustic imaging apparatus with gray scale capability will be further explained and reviewed with respect to the simplified schematic and block diagram of the pertinent components of the system shown in FIG. 3 and the typical waveform and timing diagrams given in FIGS. 4a–4j. Referring to FIGS. 4a and 4b, the synchronizing generator 30 generates two staircase or stepped wave voltage waveforms, each having $n$ steps, which are mutually synchronous but with opposite slopes. The descending stepped-wave voltage (FIG. 4a) is fed to the transmitter modulator 31, while the complementary ascending stepped-wave voltage (FIG. 4b) is fed to the display modulator 35. For the case illustrated, $n = 3$, and in general is any convenient integer. The assumption is made that the images are displayed in real time, although in general there can be a delay before feeding the output data to the display device 17', shown here as a cathode ray tube, and it is only necessary that the modulating voltages be coordinated. Transmitter modulator 31 modulates the amplitude of the acoustic bursts generated by the burst generator 32 for exciting the transmitter transducer 12. As shown in FIG. 4c, the train of acoustical energy bursts produced by transmitter 12 are equally spaced by the period T with amplitudes decreasing for $n$ cycles and automatically resetting at the end of the $n$th cycle. The amplitude of the echoes resulting from scattering from the different sized Rayleigh scatterers 11a–11c depends on the amplitude of the incident acoustic burst and the reflectivity or size of the scatterer. Tracing the three dashed acoustic rays shown in FIG. 3, it is seen that the echoes produced by the large flaw or acoustic heterogeneity 11a, the intermediate sized flaw 11b, and the small flaw 11c, are focused by lens 13 and sensed by separate piezoelectric transducers in the acoustic image converter sensor array. In the three timing diagrams of FIGS. 4d, 4e, and 4f, the horizontal dashed line 37 represents the comparator level of the sense amplifier and detector 24 associated with each individual sensor. Thus, a binary ONE is stored in shift register 26 when the amplitude of the sensed echo exceeds the level 37, and a binary ZERO is stored for echo amplitudes below this level. The sensed echoes produced by the large flaw 11a (see FIG. 4d) are of sufficiently high amplitude to exceed the comparator level 37 in each of the three successive periods corresponding to the series of three amplitude-modulated acoustic pulses. The amplitude of the sensed echoes scattered from the intermediate size flaw 11b (see FIG. 4e) is such that the third echo in each series of three is below the comparator level 37, while the echoes produced by the small flaw 11c are relatively weak such that the sensed signal in the second and third periods of the series is below the comparator level 37.

Accordingly, the serially read-out binary data produced by connecting all the individual shift registers 26 as a single long shift register is as shown in FIG. 4g. In each set of three periods during which the sensitivity of the system is successively decreased, the read-out in the first period is three binary ONE's, in the second period two binary ONE's, and in the third period only one binary ONE. The synchronized ascending stepped-wave voltage shown in FIG. 4b is supplied to the display modulator 35, and is effective to periodically modulate the amplitude of the binary output data fed serially to the cathode ray tube 17'. As is well known, the d-c level of the data bit information fed to the brightness control element of the cathode ray tube determines the brightness of the corresponding image site on the screen of the cathode ray tube as viewed by the human eye. In FIG. 3, the brightness modulated image sites 11a', 11b', and 11c' represent respectively the images of the three scatterers or flaws 11a, 11b, and 11c. FIG. 4h shows the amplitude modulated output data used to produce the high brightness image 11a' of the large-sized scatterer 11a. Since the amplitude of the sensed echo signal exceeded the comparator level 37 in all three periods of the set, an image is produced on the cathode ray tube screen in each of the three periods, with the brightness increasing by steps in the second and third periods due to the modulation by the voltage shown in FIG. 4b. These images although displayed sequentially are superimposed on the screen of the cathode ray tube and integrated by the eye or photographic film. In analogous manner, referring to FIG. 4i, images 11b' of low and intermediate brightness are formed only in the first and second periods, while only a single low brightness image 11c' (see FIG. 4j) is produced in the first period of each set of three. Although the three images in FIG. 3 are shown having different sizes, in fact the spots are about the same size on the screen with the brightness giving an estimate of the size of the scatterer or flaw in the object.

Figure 5:
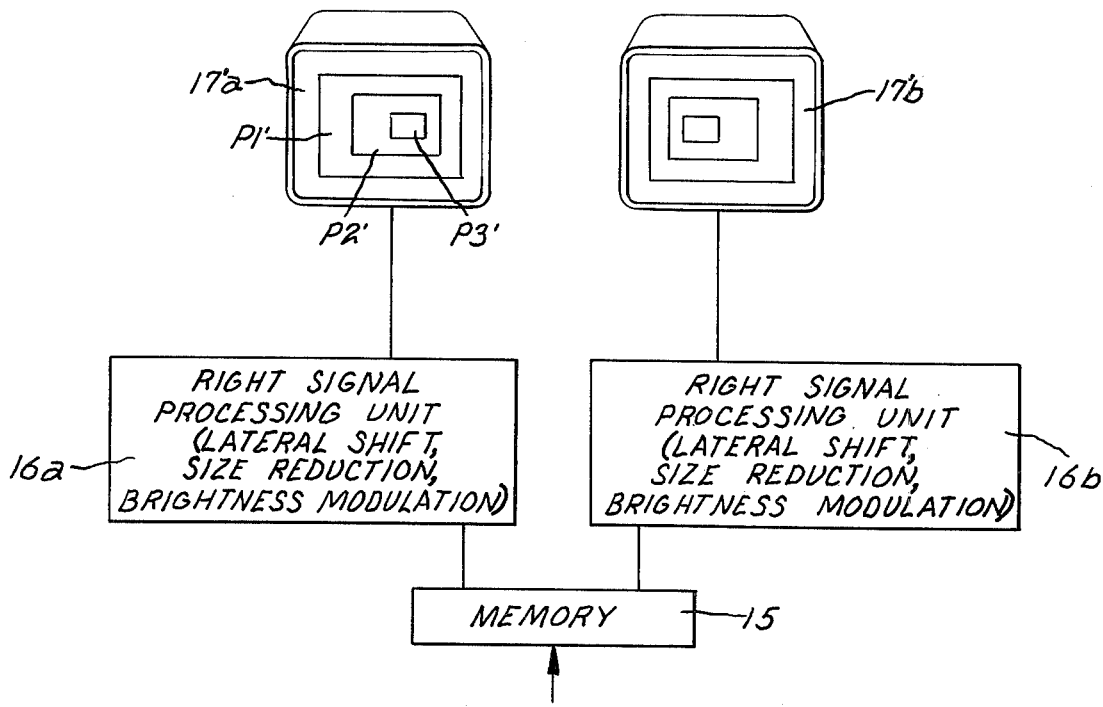
FIG. 5 is a schematic representation using block diagrams of the processing of the output data for stereo display on two simultaneously viewed cathode ray tubes.

In the second embodiment of the invention explained with regard to FIGS. 2 and 5, gray scale display capability is provided in a real time, continuous stereo visual display with depth perception. Instead of a two-dimensional image for each acoustic pulse period, multiple planes at varying depths in the object are displayed coincidentally on two simultaneously viewed cathode ray tubes to achieve a three-dimensional effect. Further information is given in the aforementioned application, Ser. No. 403,224, to which is reader is referred. As was previously mentioned, a multi-stage shift register 26 is required, with a number of stages at least equal to the number of planar regions at varying depths in the object to be displayed coincidentally within each acoustic pulse time frame, such as the planes P1, P2, and P3 in FIG. 1. During the input cycle of each individual signal processing channel (FIG. 2), a series of properly timed gating pulses are applied in parallel to the sense amplifier and detector 24 and to each stage of the shift register. Consequently, binary data is read into the first stage, and then simultaneously shifted through the shift register as additional data is subsequently read into the first stage. During the read-out cycle, the operation is as before with all the individual shift registers connected as a single long shift register through which the stored binary data is shifted and serially outputed at the last stage of the final individual shift register.

Referring now to FIG. 5, the binary output data is read into a memory 15 to facilitate a decoding and separation of the multi-plane information. Within each acoustic pulse period, the output data for the respective object planes P1, P2, P3, is fed simultaneously to a left signal processing unit 16a and a right signal processing unit 16b before being supplied respectively to the left and right cathode ray tubes 17'a and 17'b. In the left processing unit 16a, the serial output data is processed to obtain a lateral shifting to the right of the sequentially produced images P1', P2', and P3' corresponding to the different depths in the object, and optionally is processed to sequentially reduce the size of the images as illustrated. Processing unit 16a may also provide the function of the display modulator in that the binary output data is amplitude-modulated to obtain a corresponding brightness modulation of each image at a different depth. In the right processing unit 16b, the processing achieves a sequential lateral shifting to the left, a progressive size reduction, and the brightness modulation in the same manner as previously explained. The processing of the data for brightness modulation is identical in the right and left channels. With the aid of a central septum, the two cathode ray tubes are respectively viewed separately by the left eye and the right eye to obtain a three-dimensional display.

In summary, the foregoing acoustic imaging apparatus is operated to have a gray scale visual display in which the brightness modulation is related to the reflectivity of the internal heterogeneities. The apparatus can be used to estimate the size of small targets or heterogeneities having dimensions samller than one wavelength of the incident acoustic energy, and in the case of large, specularly reflecting targets or heterogeneities can lead to an estimate of the angulation and of the acoustic impedance of the target. The amplitude of the echo is a function of the angle of the incident beam to the plane of the target surface, that is, the amplitude of the echo is high when the incident beam is at right angles to the target surface and becomes progressively lower as the angle decreases. In a search mode, the transmitting transducer or transducers are moved spatially until the maximum amplitude of the echo is detected and the angular position of the target is thus estimated. A good example of the estimation of acoustic impedance in medical diagnostic applications is the case where the target is a tumor, in which case the reflectivity is sometimes a function of the nature of the tumor.

While the invention has been particularly shown and described with reference to several preferred embodiments thereof, it will be understood by those skilled in the art that various changes in form and details may be made therein without departing from the spirit and scope of the invention.

What is claimed is:

1. Acoustic imaging apparatus with a gray scale display comprising
    means for periodically generating a series of acoustic pulses that are directed toward an object and reflected by an acoustic heterogeneity in a planar object region to produce a train of acoustic echoes of varying intensity depending on the reflectivity of the heterogeneity and the amplitude of the acoustic pulse,
    acoustic image converter means and gating means therefor comprising an array of transducers and signal processing channels for individually sensing the acoustic echoes and periodically producing and reading out binary output data for the array representing the amplitudes of the sensed echoes above and below a predetermined comparator level, means for varying the amplitude of said acoustic pulses and in respectively converse manner varying the amplitude of said periodically read out binary output data to effectively change the sensitivity of the apparatus, and visual display means for periodically displaying said variable amplitude output data to produce images having a brightness indicative of the reflectivity of the heterogeneity.

2. Acoustic imaging apparatus according to claim 1 wherein said means for conversely varying the amplitude of said acoustic pulses and binary output data is operative to obtain a repeating series of acoustic pulses with a variable amplitude according to a predetermined pattern, the amplitudes of said binary output data being correspondingly varied in converse manner.

3. Acoustic imaging apparatus according to claim 2 wherein said repeating series of variable amplitude acoustic pulses and binary output data have progressive amplitude changes in decibel steps.

4. Acoustic imaging apparatus according to claim 1 wherein each signal processing channel associated with one of said transducers in said acoustic image converter means comprises a sense amplifier and detector for producing an output when each sequentially sensed echo is above the comparator level, an individual single stage shift register for storing said sense amplitude and detector outputs as binary data, and means for serially connecting said individual shift registers for reading out the stored data as said binary output data, and said visual display means comprises a single display device for periodically displaying two-dimensional images of said planar object region.

5. Acoustic imaging apparatus according to claim 1 wherein each signal processing channel associated with one of said transducers in said acoustic image converter means comprises a sense amplifier and detector for producing an output when each sequentially sensed echo is above the comparator level, an individual multi-stage shift register for storing and sequentially shifting said sense amplifier and detector outputs as binary data, and means for serially connecting said individual multi-stage shift registers for reading out the stored data as said binary output data, and said visual display means comprises a stereo visual display for periodically and coincidentally displaying multiple images of a plurality of said planar object regions at different depths in the object.

6. Acoustic imaging apparatus with a gray scale display for estimating the reflectivity of internal heterogeneities in an object comprising means for generating a repeating series of periodically timed acoustic pulses that are amplitude-modulated by steps within each series and directed toward an object being examined, focusing means for focusing a train of acoustic echoes produced by reflection from an acoustic heterogeneity within the object and having varying intensities depending on the reflectivity of the heterogeneity and the amplitude of the corresponding acoustic pulse, acoustic image converter means and gating means therefor comprising a planar array of transducers each of which converts the focused echoes to a variable electrical signal, a plurality of signal processing channels each connected to one of said transducers and including a sense amplifier and detector for producing an output when the amplitude of the sensed echo is above a predetermined comparator level, and further including an individual shift register for storing the outputs as binary data, and means for serially connecting said individual shift registers for periodically reading out the stored data as binary output data, processing means for said binary output data including means for periodically modulating the amplitude of said binary output data conversely to the modulated amplitude of said acoustic pulses in each repeating series, and visual display means for periodically displaying said modulated amplitude output data to produce images having a brightness indicative of the reflectivity of the heterogeneity.

7. Acoustic imaging apparatus according to claim 6 wherein said means for generating a repeating series of periodically timed acoustic pulses that are amplitude-modulated by steps, said gating means for said acoustic image converter means, and said means for conversely modulating the amplitude of said binary output data are all coordinated by a synchronizing generator.

8. Acoustic imaging apparatus according to claim 6 wherein said means for generating a repeating series of periodically timed acoustic pulses that are amplitude-modulated by steps and said means for conversely modulating the amplitude of said binary output data are controlled by synchronized complementary stepped-wave voltages.

9. Acoustic imaging apparatus according to claim 6 wherein said individual shift registers each have a single binary storage stage, and said visual display means is a single cathode ray tube for periodically displaying a brightness modulated image of a selected planar region within the object.

10. Acoustic imaging apparatus according to claim 6 wherein said individual shift registers each have a plurality of binary storage stages for storing and shifting sequentially produced sense amplifier and detector outputs, and said visual display means is a stereo visual display comprising a pair of cathode ray tubes for periodically and coincidentally displaying brightness modulated multiple images of a plurality of planar object regions at varying depths within the object.

* * * * *